United States Patent
Hama et al.

(10) Patent No.: US 6,873,466 B2
(45) Date of Patent: Mar. 29, 2005

(54) SCANNING OPTICAL SYSTEM

(75) Inventors: Yoshihiro Hama, Saitama-ken (JP);
Yutaka Takakubo, Saitama-ken (JP);
Yasushi Suzuki, Saitama-ken (JP);
Shimpei Shinozaki, Tokyo (JP);
Toshimitsu Saito, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/606,221

(22) Filed: Jun. 26, 2003

(65) Prior Publication Data
US 2004/0036939 A1 Feb. 26, 2004

(30) Foreign Application Priority Data

Jun. 28, 2002 (JP) .................................. 2002-189887

(51) Int. Cl.[7] .......................... G02B 27/10; B41J 27/00
(52) U.S. Cl. .................. 359/618; 359/216; 359/217; 347/258; 347/261
(58) Field of Search .................... 359/618, 196, 359/204, 206, 212, 226, 216–221, 227, 234, 520, 522, 872–874, 833–834; 347/256–262, 233–243

(56) References Cited

U.S. PATENT DOCUMENTS 5,181,137 A * 1/1993 Koide ........................ 359/217
5,784,094 A    7/1998 Ota et al. ................... 347/243
6,501,586 B1 * 12/2002 Takayama ................... 359/206

FOREIGN PATENT DOCUMENTS

| JP | 6-160743 | 6/1994 |
| JP | 10-133131 | 5/1998 |
| JP | 2001-33721 | 2/2001 |
| JP | 2003-5113 | 1/2003 |

* cited by examiner

Primary Examiner—Hung Xuan Dang
Assistant Examiner—Joseph Martinez
(74) Attorney, Agent, or Firm—Greenblum & Bernstein, P.L.C.

(57) ABSTRACT

A scanning optical system deflects a light beam by a reflection surface of a polygon mirror toward an object surface through an image forming optical system so that the light beam scans on the object surface to form an image thereon. A light shielding member is disposed between the polygon mirror and the image forming optical system. The shielding member is an opaque plate disposed perpendicular to the optical axis of the image forming optical system. The light shielding member prevents a ghost light that is reflected by another reflection surface of the polygon mirror located adjacent to the reflection surface deflecting the light beam from entering the image forming optical system and impinging onto the object surface.

9 Claims, 5 Drawing Sheets

SCANNING OPTICAL SYSTEM

BACKGROUND OF THE INVENTION

The present invention relates to a scanning optical system that scans a light beam on an object surface by deflecting the light beam with a rotating polygon mirror and passing the deflected light beam through an image forming optical system that converges the light beam on the object surface.

The scanning optical system is applied, for example, to apparatuses such as laser printers, digital copy machines, and laser facsimile machines, which form images in accordance with an electrophotographic imaging process.

In the scanning optical system, a laser beam modulated in accordance with image data is deflected by a rotating polygon mirror. The deflected laser beam is then converged on a photo-sensitive surface by an image forming optical system so as to form a beam spot that scans on the photo-sensitive surface in a main scanning direction. By repeatedly scanning the modulated laser beam while moving the photo-sensitive surface in a direction perpendicular to the main scanning direction, or an auxiliary scanning direction, in an appropriate manner, a two dimensional image made up of a plurality of dots can be formed on the photo-sensitive surface.

A critical issue in designing the scanning optical system is how to remove ghost light generated by unwanted reflection of the laser beam at one or more surfaces of the optical elements constituting the scanning optical system.

Ghost light generated by a lens of the image forming optical system, which is disposed between the polygon mirror and the photo-sensitive surface, may travel toward the polygon mirror, and then be reflected again toward the image forming optical system to strike the photo-sensitive surface.

In the above-mentioned case, if the ghost light is reflected by the same reflection surface of the polygon mirror that is reflecting the laser beam, the ghost light scans on the photo-sensitive surface at the same speed as the laser beam. Since the energy of the ghost light is much lower than that of the laser beam, the ghost light in this case does not expose the photo-sensitive surface and form a ghost image thereon.

On the contrary, if the ghost image is incident on the reflection surface of the polygon mirror adjacent to that reflecting the laser beam, the ghost light may move on the photo-sensitive surface at a much slower speed or may even substantially stop at a particular location, depending on the shape of the lens generating the ghost light. In such a case, the photo-sensitive surface is exposed and a ghost image appears.

The effect of the above-mentioned ghost light is critical in a single polygon mirror multi-beam scanning optical system in which a plurality of laser beams are simultaneously scanned by a single polygon mirror on respective photoconductive drums, each corresponding to a different color, to produce a-color image.

In the single polygon mirror multi-beam scanning optical system, the plurality of (even number of) laser beams are obliquely incident on the reflection surface of the polygon mirror from both sides of a main scanning plane so that the light beams are distributed symmetrically with respect to a main scanning plane. Here, the main scanning plane is defined as a plane perpendicular to a rotation angle of the polygon mirror and intersecting each reflection surfaces of the polygon mirror at the center thereof.

The laser beams reflected by the polygon mirror spread in a fan shape from a substantially single point on the reflection surface. The reflected laser beams are again distributed symmetrically with respect to the main scanning plane. The reflected laser beams pass through respective image forming lens systems and strike respective photoconductive drums. The laser beams form latent images on the photoconductive drums which are subsequently developed with toners of different colors. The developed images are then transferred onto a single print sheet to form a color image.

In the single polygon mirror multi-beam scanning optical system, the ghost light generated by the image forming optical system may travel toward the polygon mirror on one side of the main scanning plane and be reflected to travel on the other side of the main scanning plane. If such a ghost light travel toward the polygon mirror along a plane that is parallel to the main scanning direction and includes the original laser beam generating the ghost light, the ghost light reflected by the polygon mirror becomes to travel within an optical path of one of the laser beams traveling on the other side of the main scanning plane since the laser beams are distributed symmetrically with respect to the main scanning plane. As a result, the ghost light impinges onto a photoconductive drum corresponding to a color different from that of the original laser beam generating the ghost light. Such a ghost image may be formed on each photoconductive drum, and thereby cause significant deterioration in the quality of the finally produced color image.

Therefore, there is a need for a scanning optical system that is capable of preventing the above-mentioned ghost light, which is reflected by the reflection surface of the polygon mirror adjacent to the reflection surface deflecting the light beam generating the ghost light, from entering again the image forming optical system.

SUMMARY OF THE INVENTION

The present invention is advantageous in that a scanning optical system is provided that satisfies the above-mentioned need.

According to an aspect of the invention, there is provided a scanning optical system including a light source that emits a light beam, and a polygon mirror arranged to rotate about a rotation axis and having a reflection surface parallel to the rotation axis. The reflection surface deflects the light beam emitted from the light source so as to scan the light beam on an object surface.

An image forming optical system is disposed between the polygon mirror and the object surface. The light beam deflected by the reflection surface is converged by the image forming optical system on the object surface.

Further, a light shielding member is disposed between the polygon mirror and the image forming optical system. The light shielding member blocks a ghost light that is generated by the image forming optical system partially reflecting the light beam toward the polygon mirror and then being reflected by another reflection surface of the polygon mirror, which is located adjacent to the reflection surface deflecting the light beam, toward the image forming optical system. Thus, the ghost light does not enter the image forming optical system and impinge onto the object surface to form a ghost image thereon.

Optionally, the light shielding member is an opaque plate. Further optionally, the opaque plate is disposed perpendicular to an optical axis of the image forming optical system. Alternatively, the opaque plate is disposed in parallel to a direction in which the light beam is scanned on the object surface by the polygon mirror.

Optionally, the light shield member is disposed out of a beam scanning area within which the light beam is to be scanned by the polygon mirror, so that the light shielding member does not interfere with the laser beam forming an image on the object surface. For example, the light shielding member is disposed such that one end thereof is located within an area surrounded by the reflection surface deflecting the light beam, the beam scanning area, and an area within which the ghost image reflected by the another reflection surface is to be scanned.

Optionally, the scanning optical system includes a plurality of the light sources arranged to emit a plurality of the light beams toward a substantially single point defined in a vicinity of the reflection surface of the polygon mirror. The plurality of light beams are distributed symmetrically with respect to a main scanning plane, which plane passes through the above-mentioned single point and is perpendicular to the rotation axis of the polygon mirror. Further, the image forming optical system is arranged to converge the plurality of light beams deflected by the polygon mirror on different photoconductive drums.

In the scanning optical system configured as described above, the light shielding member prevents the ghost image caused by one of the plurality of light beams and reflected by the another reflection surface of the polygon mirror from entering the image forming optical system and traveling toward the photoconductive drum corresponding to another one of the plurality of the light beams. Thus, the ghost light does not expose the photoconductive drum corresponding to another one of the light beams to form a ghost image thereon, which causes deterioration of the quality of the image produced by the scanning optical system.

DETAILED DESCRIPTION OF THE EMBODIMENTS

Hereinafter, a scanning optical system according to an embodiment of the invention will be described with reference to the accompanying drawings. It should be noted that in the embodiment described below, the scanning optical system according to the invention is applied to a color printer for forming a color image in accordance with an electrophotographic process.

Figure 1:
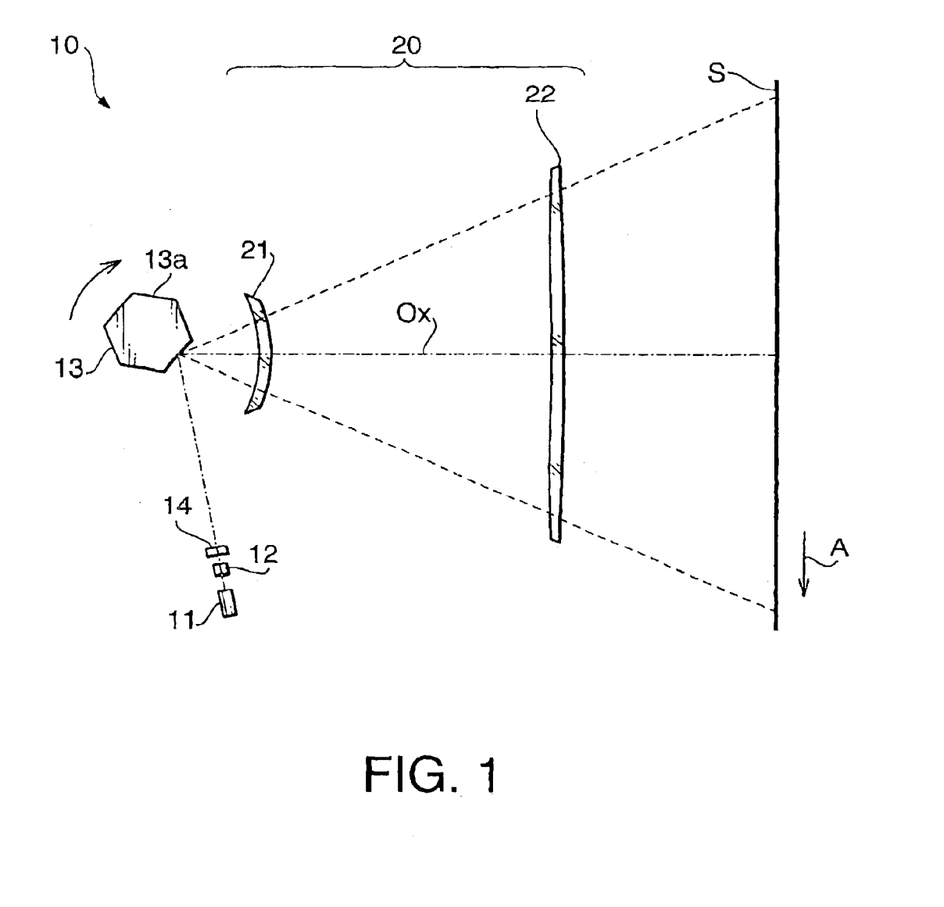
FIG. 1 schematically illustrates basic optical configuration of the scanning optical system according to the embodiment of the present invention.

FIG. 1 schematically illustrates basic optical configuration of the scanning optical system 10 according to the embodiment of the invention. As can be seen in FIG. 1, the basic optical configuration of the scanning optical system 10 includes a laser source 11, a collimator lens 12, a cylindrical lens 14, a polygon mirror 13, and an fθ lens system (an image forming optical system) 20.

The laser source 11 emits a laser beam toward the polygon mirror 13 through the collimator lens 12 and the cylindrical lens 14. The polygon mirror 13 has a plurality of side surfaces which serve as reflection surfaces for deflecting the laser beam incident thereon. The polygon mirror 13 is arranged to rotate about a rotation axis 13a at a constant angular speed. Thus, the laser beam deflected by the reflection surfaces of the polygon mirror 13 is scanned in a direction indicated by an arrow A. The direction indicated by the arrow A is perpendicular to the rotation axis 13a of the polygon mirror 13 and will be referred to hereinafter as a main scanning direction. Further, a direction parallel to the rotation axis 13a will be referred to hereinafter as an auxiliary scanning direction.

The laser beam deflected by the polygon mirror 13 passes through the fθ lens system 20 so as to be converged on a photo-sensitive surface S of a photoconductive drum 60 (not shown in FIG. 1), which photoconductive drum 60 is arranged to rotate about a rotation axis parallel to the main scanning direction.

The laser beam emitted from the laser source 11 is converted, by the collimator lens 12, from a divergent light flux into a parallel light flux. Then, the laser beam is converged on or near the reflection surfaces of the polygon mirror 13 by the cylindrical lens 14 in the auxiliary direction only. Then, the laser beam is reflected by one of the reflection surfaces of the polygon mirror 13 and passes through the fθ lens 20 to be converged on the photo-sensitive surface S in both the main and auxiliary scanning directions.

In the optical system arranged as described above, the reflection surfaces of the polygon mirror 13 are optically conjugated to the photo-sensitive surface S through the fθ lens system 20 with respect to the auxiliary scanning direction. Thus, the laser beam reflected by the reflection surfaces of the polygon mirror 13 will be scanned along the same line on the photo-sensitive surface S irrespective of the tilting error of the reflection surfaces.

The fθ lens system 20 is composed of a scanning lens 21 and a field curvature correction lens 22 that is disposed on the photo-sensitive surface side of the scanning lens 21. The scanning lens 21 has a power that converges the laser beam mainly in the main scanning direction, while the field curvature correction lens 22 has a power that converges the laser beam mainly in the auxiliary scanning direction. The field curvature correction lens 22 also corrects aberrations such as field curvature and fθ characteristic error.

The scanning lens 21 and the field curvature correction lens 22 are disposed such that the optical axes thereof lie on a common plane that is parallel to the auxiliary scanning direction. Further, the scanning lens 21 and the field curvature correction lens 22 are disposed such that the laser beam reflected at the center of each reflection surface of the polygon mirror 13 travels along the above-mentioned common plane. Further more, the scanning lens 21 is disposed such that the optical axis thereof lies on a plane that intersects perpendicularly the rotation axis 13a at the center of the polygon mirror 13.

It should be noted that each of the scanning lens 21 and the field curvature correction lens 22 can be an aspheric and rotational asymmetric lens. Since the optical axis cannot be defined for such a lens, a line that passes through the points of origin of the equations defining the front and rear surfaces of the lens, or optical surface reference axis, will be referred to hereinafter as the optical axis.

Further, a plane parallel to the rotation axis of the polygon mirror 13 and including the optical axis of the scanning lens 21 will be referred to hereinafter as an auxiliary scanning plane, while a plane that is perpendicular to the rotation axis 13a of the polygon mirror 13 and includes the optical axis of the scanning lens 21 will be referred to as a main scanning plane.

The scanning optical system 10 is provided with four sets of all elements mentioned above except the polygon mirror 13 and the scanning lens 21 (i.e. the laser source 11, the collimator lens 12, the cylindrical lens 14, the field curvature correction lens 22, and the photosensitive surface S). Each set of the elements corresponds to different color, i.e. yellow, magenta, cyan and black. The scanning optical system 10 simultaneously forms latent images on four photoconductive drums 60 with four laser beams. The latent images are then developed by yellow, magenta, cyan and black toners, respectively, and transferred sequentially on a single print sheet to produce a color image.

Figure 2:
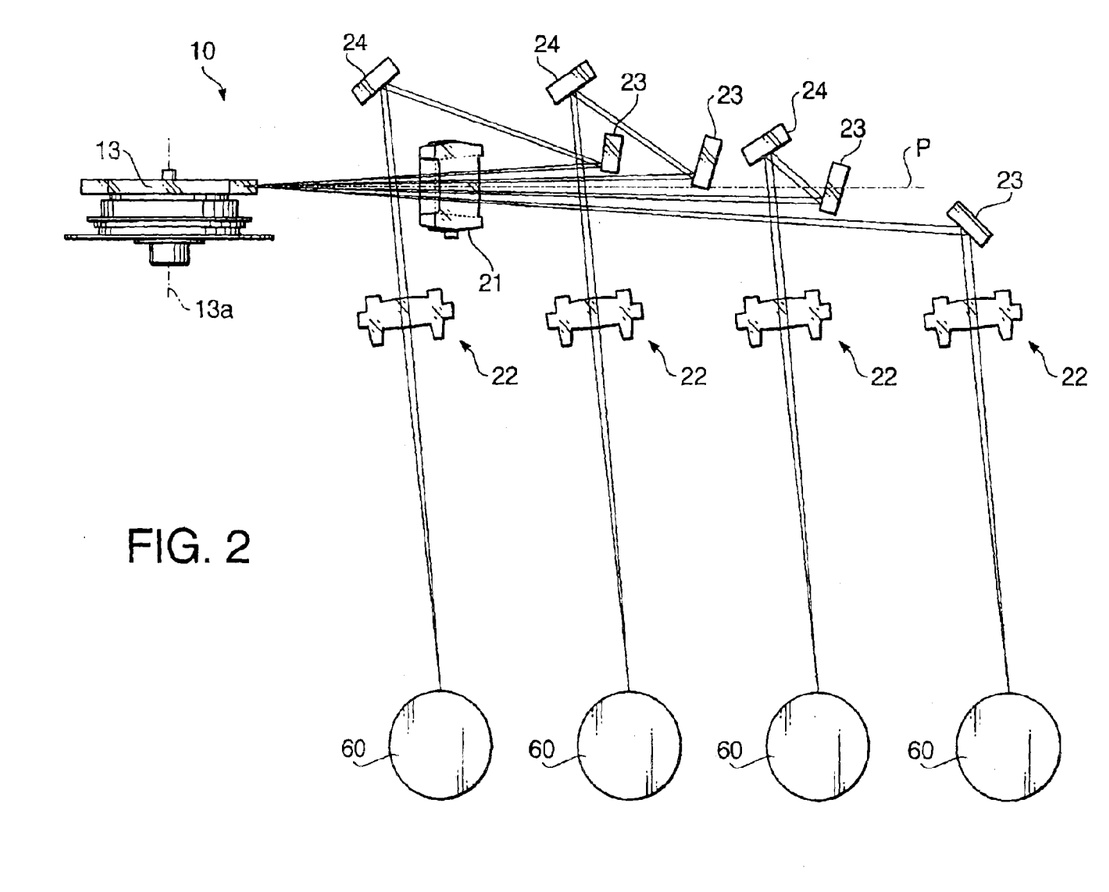
FIG. 2 shows a sectional view of the scanning optical system according to the embodiment of the invention.

FIG. 2 shows a sectional view of the scanning optical system 10 according to the present embodiment taken along the auxiliary scanning plane. FIG. 2 also shows laser beams reflected by the polygon mirror 13 at substantially the center of one of the reflection surfaces.

The four laser beams impinge onto the same reflection surface of the polygon mirror 13 at substantially the same position. Two of the four laser beams are obliquely incident on the polygon mirror 13 from one side (upper side in FIG. 2) of the main scanning plane P and the other two from the other side (lower side). The laser beams are incident on the polygon mirror 13 so as to be distributed symmetrically with respect to the main scanning plane P. The laser beams reflected by the polygon mirror spread in a fan shape from a substantially single point on the reflection surface. Thus, reflected laser beams are distributed symmetrically with respect to the main scanning plane again.

After being reflected by the polygon mirror 13, the laser beams pass through the scanning lens 21 which is used in common by the four laser beams. Then, the laser beams pass through respective field curvature correction lenses 22, and impinge onto respective photoconductive drums 60. Thus, the four laser beams are simultaneously scanned on the four photoconductive drum 60 by the same reflection surface of the polygon mirror 13.

Note that, in order to reduce the total size of the scanning optical system 10, the optical path of each laser beam between the common scanning lens 21 and the corresponding field curvature correction lens 22 is bent by two mirrors 23 and 24, except that of the laser beam striking the photoconductive drum 60 located most apart from the polygon mirror 13 which is bent only once by the mirror 23.

The mirrors (23, 24) are arranged such that each laser beam has the same light path length between the common scanning lens 21 and the respective field curvature correction lenses 22. Thus, the optical property of the fθ lens system 20 is identical for each laser beam.

The photoconductive drums 60 have the same size and shape and are disposed at the same distance from the corresponding field curvature correction lens 22.

The color printer, to which the scanning optical system 10 according to the present embodiment is applied, rotates the photoconductive drums 60 at a predetermined revolving speed and repeatedly scans the laser beams on the photosensitive surfaces S. The laser beams are modulated on and off in accordance with respective image data while the laser beams are scanned on respective photoconductive drums 60. In this way, a two dimensional latent image made up of a series of scanning lines is formed on the photosensitive surface S of each photoconductive drum 60.

Next, toner is applied to the latent image of each photoconductive drum 60 to form a developed image. Each photoconductive drum is supplied with toner of different color, i.e. yellow, magenta, cyan, and black. The developed images are then transferred onto a single print sheet to form a color image. Note that the print sheet is carried through the color printer so that corresponding scanning lines of the developed images are transferred onto the same line on the print sheet.

In the scanning optical system 10 arranged as above, ghost light may be generated by regular reflection of the laser beam at one of the lens surfaces in the fθ lens system 20. The scanning optical system 10 is configured so as to prevent the ghost light generated by one laser beam from entering the optical path of another laser beam and impinging onto the photoconductive drum corresponding to the above-mention another laser beam as will be described hereinafter.

Figure 3:
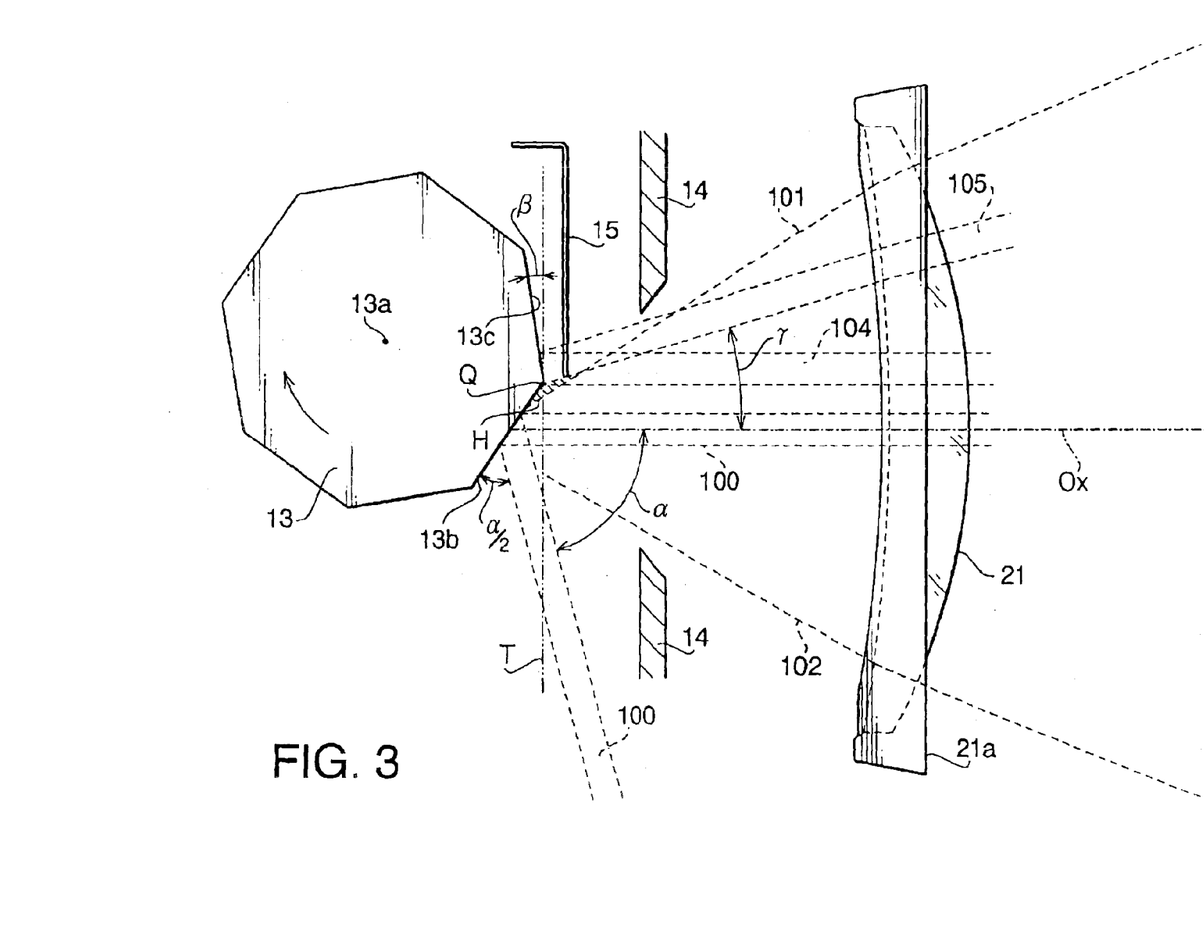
FIGS. 3 through 5 are enlarged top views of a part of the scanning optical system shown in FIG. 1.

FIG. 3 is an enlarged top view of a part of the scanning optical system 10 shown in FIG. 1.

The scanning lens 21 is supported by a holder 21a that is secured to a casing (not shown) of the color printer. Two light shielding walls 14 are disposed between the polygon mirror 13 and the scanning lens 21 in order to prevent stray light from traveling toward the photosensitive surface S. The light shielding walls 14 are spaced apart from each other so as to form an opening that allows the laser beam deflected by the polygon mirror 13 to pass therethrough.

The light flux labeled 100 indicates the laser beam emitted from the laser source 11 and being incident on the reflection surface 13b of the polygon mirror 13. Note that the laser beam 100 will be referred to hereinafter as regular beam 100, and the reflection surface 13b as regular beam reflecting surface 13b.

The broken lines 101 and 102 indicate the area within which the regular beam 100 is to be scanned by the rotating polygon mirror 13. Since the polygon mirror 13 is rotated in clockwise direction in the present embodiment, the regular beam 100 is scanned from the broken line 101 toward the broken line 102.

In FIG. 3, the regular beam 100 is incident on the regular beam reflecting surface 13b at the center thereof. Thus, after being reflected by the regular beam reflecting surface 13b, the regular beam 100 travels along the auxiliary scanning plane which is parallel to the rotation axis 13a of the polygon mirror 13 and on which the optical axis Ox of the fθ lens system 20 (the scanning lens 21) lies.

The light flux labeled 104 in FIG. 3 indicates a ghost light generated by the regular beam 100 partially reflected at one of the lens surfaces of the field curvature correction lens 22. The ghost light 104 propagates along a plane that is parallel to the main scanning direction and on which the regular beam 100 reflected by the polygon mirror 13 lies. The ghost light 104 is however slightly inclined against the regular beam 100 within the above-mentioned plane. Thus, the ghost light 104 is also slightly inclined against the optical axis Ox of the fθ lens system 20 (the scanning lens 21) when observed from the auxiliary scanning direction as shown in FIG. 3.

It should be noted that the field curvature correction lens 22 is located at a relatively long distance from the polygon mirror 13, resulting in a relatively long light path of the ghost light 104. Due to this long light path, the ghost light 104 arriving at the polygon mirror 13 is displaced from the regular beam 100 although the above-mentioned plane is only slightly inclined against the optical axis Ox of the fθ lens system 20. As a result, the ghost light 104 strikes the reflection surface 13c adjacent to the regular beam reflecting surface 13b, which will be referred to hereinafter as adjacent reflection surface 13c. The ghost light 104 is then reflected by the adjacent reflection surface 13c toward the scanning lens 21 as indicated by the light path labeled 105, however, this time on the side of the main scanning plane opposite to the side on which the regular beam 100 reflected by the regular beam reflecting surface 13b travels.

In FIG. 3, angle α represents the angle between the regular beam 100 incident on the regular beam reflecting surface 13b and the optical axis Ox of the fθ lens system 20 (the scanning lens 21), or the deflection angle of the regular beam in FIG. 3. The chain double-dashed line T represents a virtual plane that is perpendicular to the optical axis Ox of the fθ lens system 20 (the scanning lens 21) and passes through a vertex Q of a corner formed between the regular beam reflecting surface 13b and the adjacent reflection surface 13c. Angle β is the angle between the adjacent reflection surface 13c and the virtual plane T. The angles α and β are related to each other by the following equation, $$\beta = \pi - \alpha/2 - (N-2)\pi/N \quad (1)$$

where N represents the number of reflection surfaces of the polygon mirror 13.

Assuming that the ghost light 104 travels in parallel to the optical axis Ox of the fθ lens system 20 (the scanning lens 21) and impinges onto the adjacent reflection surface 13c so as to be tangent to the vertex Q, the angle γ defined between the ghost light 105 reflected by the adjacent reflection surface 13c and the optical axis Ox of the fθ lens system 20 (the scanning lens 21) is twice as large as angle β. Thus, $$\gamma = 2\pi - \alpha - 2(N-2)\pi/N \quad (2)$$

The hatched space H in FIG. 3 indicates a space surrounded by the regular beam reflecting surface 13b, the broken line 101 indicating the side edge of the area within which the regular beam is to be scanned, and a line passing through the vertex Q and inclined against the optical axis of the fθ lens system 20 for an angle of γ.

The hatched space H is located out of the scanning area of the regular beam. Further, the hatched space H is on a side of the ghost light 105 on which the optical axis Ox of the fθ lens system 20 exists.

A light shielding plate 15 is disposed near the polygon mirror 13 so as to prevent the ghost light 105 from traveling toward the scanning lens 21 (and entering an optical path of one of the laser beams other that the regular beam 100).

The light shielding plate 15 is an opaque plate having a substantially rectangular shape the light shielding plate 15 is disposed in parallel to the rotation axis 13a of the polygon mirror 13. Further, the light shielding plate 15 is disposed perpendicularly to the optical axis Ox of the fθ lens system 20 with one of the ends thereof located in the hatched space H.

In other words, the light shielding plate 15 is located out of the scanning area of the regular beam. Thus, the light shielding plate 15 does not interfere with the regular beam deflected toward the photo-sensitive surface S of the photoconductive drum 60. The light shielding plate 15 blocks only the ghost light 105 reflected by the adjacent reflection surface 13c so that no ghost image will be formed on any of the four photoconductive drum 60.

Figure 4:
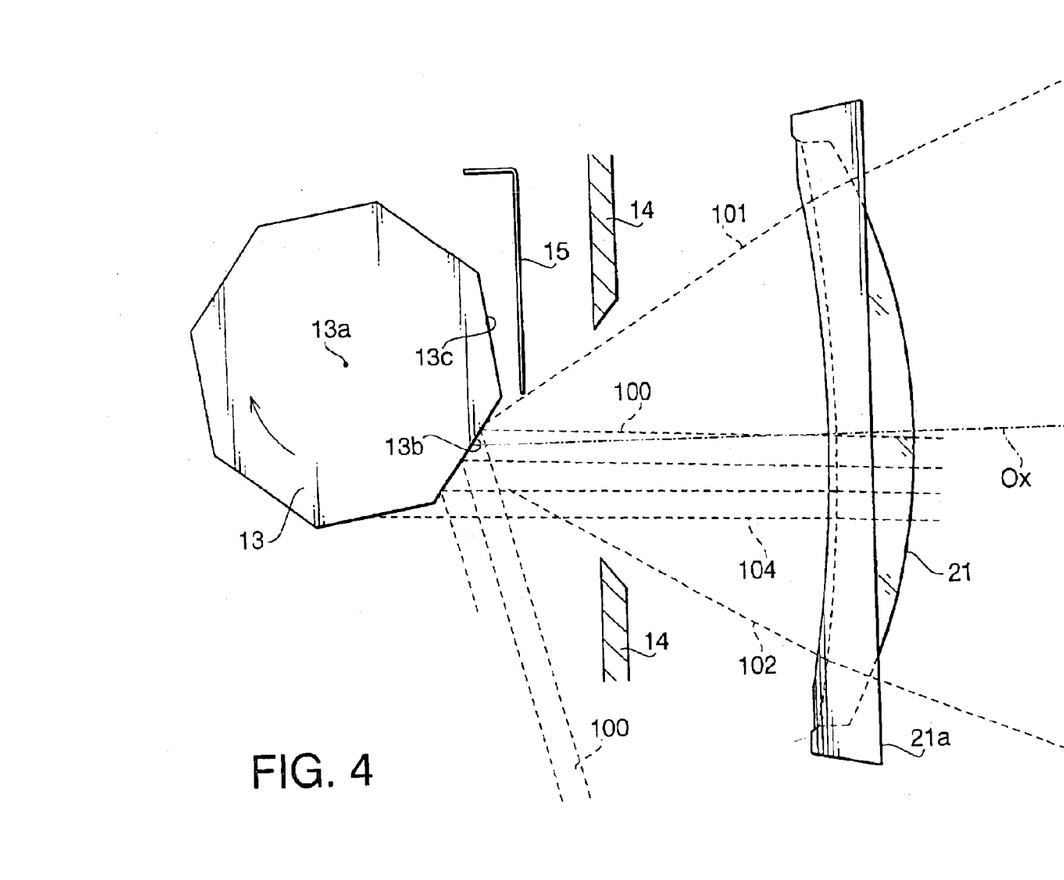

FIG. 4 is an enlarged top view of the same part of the scanning optical system 10 shown in FIG. 3. In FIG. 4, the polygon mirror 13 is rotated in clockwise direction from the position shown in FIG. 3 for a small angle.

In FIG. 4, the regular beam 100 is reflected by the regular beam reflecting surface 13b so as to incline against the optical axis Ox of the fθ lens system 20 toward the regular beam 100 incident on the regular beam reflecting surface 13b. The ghost light 104 generated by the regular beam 100 reflected as above impinges not onto the adjacent reflection surface 13c but onto the regular beam reflecting surface 13b. The ghost light 104 is then reflected to a direction out of the scanning area of the regular beam defined between broken lines 101 and 102, and thus does not travel toward and enter the scanning lens 21 again.

Figure 5:
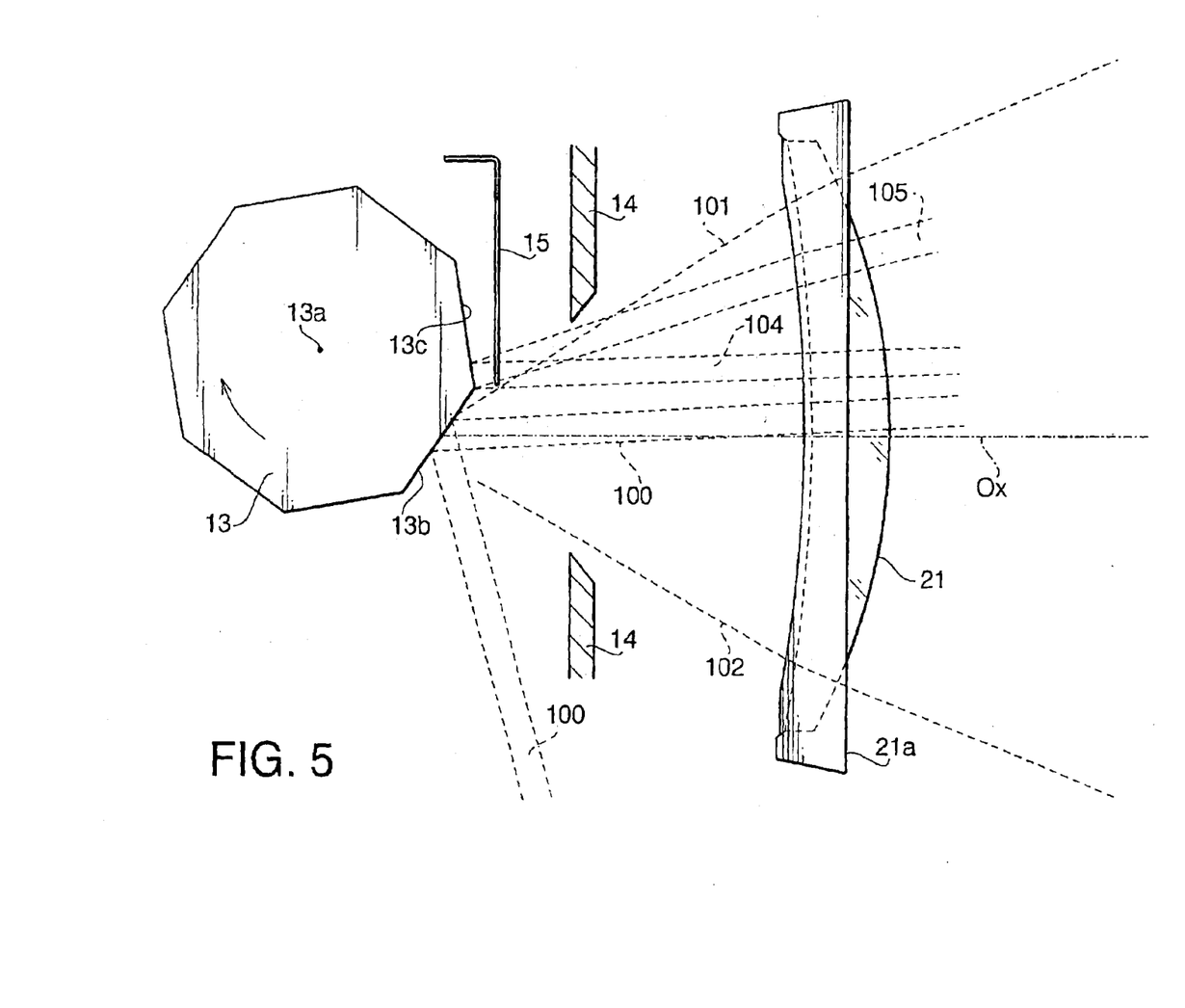

FIG. 5 is an enlarged top view of the same part of the scanning optical system 10 shown in FIG. 3. In FIG. 5, the polygon mirror 13 is rotated in counterclockwise direction from the position in FIG. 3 for a small angle.

In FIG. 5, the regular beam 100 is reflected by the regular beam reflecting surface 13b so as to incline against the optical axis of the fθ lens system 20 toward a direction opposite to the regular beam 100 incident on the reflection surface 13b. As a result, the ghost light 104 impinging onto the adjacent reflection surface 13c is displaced from the optical axis Ox of the fθ lens in the main scanning direction more than that of the ghost light 104 shown in FIG. 3. Thus, the ghost light 105 reflected by the adjacent reflection surface 13c impinges onto the light shielding plate 15 more inside thereof than the ghost light 105 shown in FIG. 3 and does not travel toward the scanning lens 21.

As described above, the scanning optical system 10 according to the present invention is provided with the light shielding plate 15 disposed near the polygon mirror. The light shielding plate 15 prevents the ghost light reflected by the adjacent reflection mirror 13c from traveling toward the fθ lens system 20 and finally impinging on the photosensitive surface S of one of the photoconductive drums 60. Thus, the quality of the color image produced by the scanning optical system 10 does not deteriorate due to the ghost image formed by the ghost light.

The present disclosure relates to the subject matter contained in Japanese Patent Application No. P2002-189887, filed on Jun. 28, 2002, which is expressly incorporated herein by reference in its entirety.

What is claimed is:

1. A scanning optical system, comprising:
   a plurality of light sources that emit a plurality of light beams;
   a polygon mirror arranged to rotate about a rotation axis and having a reflection surface parallel to said rotation axis, said light sources being arranged to emit said light beams toward a substantially single point defined in a vicinity of said reflection surface of said polygon mirror, said light beams being distributed symmetrically with respect to a main scanning plane, said main scanning plane passing through said single point and being perpendicular to said rotation axis of said polygon mirror, said reflection surface deflecting said light beams so as to scan said light beams on different photoconductive drums;
   an image forming optical system disposed between said polygon mirror and the different photoconductive drums to converge the light beams deflected by said reflection surface on the different photoconductive drums; and
   a light shielding member disposed between said polygon mirror and said image forming optical system, said light shielding member blocking a ghost light reflected by another reflection surface of the polygon mirror located adjacent to the reflection surface deflecting the light beams, said ghost light being generated by said image forming optical system partially reflecting said light beams toward the polygon mirror.

2. The scanning optical system according to claim 1, wherein said light shielding member is an opaque plate.

3. The scanning optical system according to claim 2, wherein said opaque plate is disposed perpendicular to an optical axis of said image forming optical system.

4. The scanning optical system according to claim 2,
wherein said light beams are scanned on the different photoconductive drums in a main scanning direction, and
wherein said opaque plate is disposed in parallel to said main scanning direction.

5. The scanning optical system according to claim 1, wherein said light shielding member is disposed out of a beam scanning area within which said light beams are to be scanned by said polygon mirror.

6. The scanning optical system according to claim 5, wherein said light shielding member is disposed such that one end thereof is located within an area surrounded by said reflection surface deflecting said light beams, said beam scanning area, and an area within which said ghost image reflected by said another reflection surface is to be scanned.

7. The scanning optical system according to claim 1, wherein said plurality of light sources comprises an even number of said light sources.

8. The scanning optical system according to claim 1, wherein said plurality of light sources comprises four of said light sources.

9. The scanning optical system according to claim 1, further satisfying the following condition:

$$\gamma = 2\pi - \alpha - 2(N-2)\pi/N;$$

wherein $\gamma$ is an angle defined between an optical axis of said image forming optical system and the ghost light reflected by said another reflection surface of the polygon mirror, $\alpha$ is an angle defined between the optical axis of said image forming optical system and the light beams incident on said reflection surface of the polygon mirror, and N is the number of reflection surfaces of said polygon mirror.

* * * * *